US008095756B1

(12) United States Patent
Somavarapu et al.

(10) Patent No.: US 8,095,756 B1
(45) Date of Patent: Jan. 10, 2012

(54) SYSTEM AND METHOD FOR COORDINATING DEDUPLICATION OPERATIONS AND BACKUP OPERATIONS OF A STORAGE VOLUME

(75) Inventors: Nagender Somavarapu, Bangalore (IN); Anil Kumar Ponnapur, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 450 days.

(21) Appl. No.: 12/431,510

(22) Filed: Apr. 28, 2009

(51) Int. Cl.
*G06F 13/00* (2006.01)
(52) U.S. Cl. .................... 711/162; 711/167; 711/163
(58) Field of Classification Search .............. 711/162, 711/167, 163
See application file for complete search history.

(56) References Cited

U.S. PATENT DOCUMENTS

| 2007/0255758 | A1 | 11/2007 | Zheng et al. | |
| 2008/0005141 | A1 | 1/2008 | Zheng et al. | |
| 2008/0294696 | A1 | 11/2008 | Frandzel | |
| 2010/0077161 | A1* | 3/2010 | Stoakes et al. | 711/162 |
| 2011/0072291 | A1* | 3/2011 | Murase | 713/324 |

FOREIGN PATENT DOCUMENTS
WO  WO 2008/005211 A2  1/2008

OTHER PUBLICATIONS

Broder, Andrei and Mitzenmacher, Michael, "Network Applications of Bloom Filters: A Survey", Internet Mathematics, May 10, 2004, vol. 1, No. 4: pp. 485-509 (25 pages).
Broder, Andrei and Mitzenmacher, Michael, "Network Applications of Bloom Filters: A Survey", 11 pages.
Cameron, Pete, "Dedupe on Filers: The Good, The Bad and The (not very) Ugly", NetApp 2008, pp. 1-50.
Cao, Pei, "Bloom Filters-the math", available at : http://pages.cs.wisc.edu/~cao/papers/summary-cache/node8.html, Jul. 5, 1998, pp. 1-6.
Ceglowski, Maciej, "Using Bloom Filters", available at: http://www.perl.com/lpt/a/831, Apr. 8, 2004, pp. 1-9.
Chapa, David, "Choosing the Right Backup Technology", NetApp Tech OnTap 2008, 4 pages.
Chapman, Darrin, "Tackle the Top Three VMWare Backup Challenges", NetApp Tech OnTap 2008, 4 pages.
Dharmapurikar, Sarang, Krishnamurthy Praveen, and Taylor, David E., "Longest Prefix Matching using Bloom Filters," SIGCOMM'03, Aug. 25-29, 2003, Karlsruhe Germany, ACM, 12 pages.

(Continued)

*Primary Examiner* — Alexander Sofocleous
*Assistant Examiner* — Han Yang
(74) *Attorney, Agent, or Firm* — Brinks Hofer Gilson & Lione

(57) ABSTRACT

A system and method are described for coordinating deduplication operations and backup operations of a storage volume. In one embodiment, a request is identified to eliminate duplicate data from a storage volume. The storage volume may be scheduled to be backed up on a periodic basis. The duration of time required to complete an operation to eliminate duplicate data from the storage volume may be determined. The determination may be based on the amount of data modified on the storage volume since the last operation to eliminate duplicate data from the storage volume. The determined duration of time may be used to schedule the start time of the operation to eliminate duplicate data such that the operation is completed prior to the next scheduled backup of the storage volume. The operation may be initiated at the scheduled start time, ensuring the operation is completed prior to the next scheduled backup.

24 Claims, 8 Drawing Sheets

OTHER PUBLICATIONS

Dillinger, Peter C. and Panagiotis, Manolios, "Bloom Filters in Probabilistic Verification", Georgia Institute of Technology College of Computing, CERCS, pp. 1-15.

Dillinger, Peter C. and Manolios, Panagiotis, "Fast and Accurate Bitstate Verification for SPIN", Georgia Institute of Technology College of Computing, CERCS, pp. 1-19.

Duxbury, Bryan, "Engineering Rapleaf-Bloom Filters", available at: http://blog.rapleaf.com/dev/?p=6, pp. 1-2.

Freeman, Larry, "How Safe is Deduplication?", NetApp Tech OnTap 2008, 2 pages.

Gregorio, Joe, "BitWorking—Bloom Filter Resources", available at: http://bitworking.org/news/380/bloom-filter-resources, Oct. 19, 2008, pp. 1-6.

Jaspreet, "Understanding Data Deduplication", available at: http://blog.druva.com/2009/01/09/understanding-data-deduplication, Jan. 9, 2009, pp. 1-10.

Lewis, Blake, "Deduplication Comes of Age", available at: http://www.netapp.com/us/communities/tech-ontap/dedupe-0708.html, downloaded on Mar. 18, 2009, pp. 1-3.

Osuna, Alex, "IBM System Storage N series A-SIS Deduplication", Redbooks, created or updated on Mar. 13, 2009, pp. 1-76.

Osuma, Alex, 'IBM System Storage N series A-SIS Deduplication Deployment and Implementation Guide, Redpaper, 2007, pp. 1-30.

Ripeanu, Matei and Iamnitchi, Adriana, "Bloom Filters—Short Tutorial", pp. 1-4.

Singh, Jaspreet, "Data Deduplication—A Detailed Overview", Artipot, available at: http://www.artipot.com/articles/266989/data-deduplication-a-detailed-overview.htm, Jan. 14, 2009, 3 pages.

"Bit Array", Wikipedia, available at: http://en.wikipedia.org/wiki/Bit_array, last modified on Mar. 14, 2009, pp. 1-6.

"Bloom filter", Wikipedia, available at: http://en.wikipedia.org/wiki/Bloom_filter, last modified on Mar. 18, 2009, pp. 1-11.

"Bloom Filters", (powerpoint presentation), available at: http://www.cs.tau.ac.il/~hanoch/Courses/DS/DS-bloom-filter%5B1%5D.ppt, downloaded on Mar. 19, 2009, pp. 1-15.

"Deduplication Frequently Asked Questions", datadomain, available at: http://datadomain.com/resources/faq.html, copyright 2003-2009, downloaded on Feb. 19, 2009, pp. 1-4.

"Hash function", Wikipedia, available at: http://en.wikipedia.org/wiki/Hash_function, last modified on Mar. 14, 2009, pp. 1-9.

"Hash Table with Preemptive Bloom Filter", My Biased Coin, available at: http://mybiasedcoin.blogspot.com/2009/02/hash-table-with-preemptive-bloom-filter.html; Feb. 27, 2009, pp. 1-4.

"Introduction and Overview of Deduplication", NetApp Deduplication for FAS and V-Series Deployment and Implementation Guide, pp. 4-6 (3 pages).

"NetApp Deduplication for FAS Deployoment and Implementation Guide", NetApp Technical Report TR-3505, Sep. 2008, pp. 1-40.

"Scalable Datasets: Bloom Filters in Ruby", igvita.com, available at: http://www.igvita.com/2008/12/27/scalable-datasets-bloom-filters-in-ruby/, Dec. 27, 2008, pp. 1-7.

"Tech OnTap Special Edition: Backup and Recovery", NetApp Tech OnTap 2008, 1 page.

"Technical Overview of NetApp SnapDrive," Network Appliance, Inc., TR-3197, Apr. 2007, pp. 1-12.

"IBM System Storage N series Storage Optimization", IBM Corporation, Aug. 28, 2007, pp. 1-22.

* cited by examiner

SYSTEM AND METHOD FOR COORDINATING DEDUPLICATION OPERATIONS AND BACKUP OPERATIONS OF A STORAGE VOLUME

BACKGROUND

Deduplication refers to the process of eliminating duplicate data objects from a storage volume. A storage volume may only require one instance of a data object to be stored; additional instances of the data object may be replaced with a pointer to the original data object. By eliminating redundant data objects and referencing only the original object, immediate benefits may be obtained through storage space efficiencies. However, deduplication operations may be ineffective on read-only storage volumes, such as some backup volumes, because the duplicate data can not be removed from read-only storage volumes. Thus, if a backup volume is created from a storage volume containing duplicate data, the duplicate data may be "locked" in the backup volume. Furthermore, if a snapshot operation begins while a deduplication operation is occurring, temporary metadata used by the deduplication operation may be locked in the snapshot volume.

In order to ensure duplicate data is not locked in a backup of a storage volume, the storage volume should be deduplicated immediately prior to creating the backup. Backup operations of a storage volume are often scheduled to occur at periodic intervals. The scheduled start time of each backup operation may be controlled by service level agreements, or other regulations, which may stipulate that the scheduled backups not be delayed. In these cases, a backup operation on a storage volume can not be delayed to allow a deduplication operation on the storage volume to complete. If a deduplication operation is not complete prior to the scheduled start time of a backup, any duplicate data on the storage volume will be locked in the backup. Therefore, deduplication operations are often scheduled to occur at regular intervals offset from the periodic backups. However, the time interval required for a deduplication operation may vary greatly depending upon the amount of data that needs to be deduplicated. The variance in time required for each deduplication operation renders deduplication operations scheduled at regular intervals largely ineffective. The deduplication operations may not always complete prior to the start of the next scheduled backup, resulting in any duplicate data being locked in the backup. Thus, there may be a need for coordinating deduplication and backup operations of a storage volume to ensure duplicate data is not stored in the periodic backups of the storage volume.

DETAILED DESCRIPTION

In these embodiments, a system is presented for coordinating deduplication operations and backup operations of a storage volume, which provides an advantage over the prior systems by ensuring duplicate data is removed from a storage volume prior to performing a backup operation on the storage volume. Ensuring duplicate data is removed from a storage volume prior to performing a backup operation on the storage volume reduces the storage space required for each backup, thereby greatly reducing the cost associated with storing each backup of the storage volume. Coordinating deduplication operations and backup operations of a storage volume may be achieved by scheduling each deduplication operation to complete immediately prior to the start of the next scheduled backup operation. By scheduling each deduplication operation to complete immediately prior to the start of the next backup operation, the system can ensure the storage volume is deduplicated immediately prior to creating a backup of the storage volume, thereby ensuring that no duplicate data is stored in the backup.

The system in these embodiments may prevent duplicate data from being stored in any backup datasets of a storage volume, such as a backup, a snapshot, or a mirror. The backup datasets may be read-only, meaning duplicate data can not be removed from the backup datasets. As such, any duplicate data needs to be eliminated from a storage volume immediately prior to creating a backup of the storage volume. The storage volume may be backed up at scheduled periodic intervals. The scheduled intervals may be identified by a service level agreement, or other regulations, which may require that the backup intervals not be modified or delayed. Thus, a scheduled backup of a storage volume can not be delayed to allow a deduplication of a storage volume to complete. In this case, the system must ensure that the deduplication of a storage volume is completed prior to the start of the next scheduled backup. The duration of time required to complete a deduplication of the storage volume may be determined based on the amount of data on the storage volume that has been modified since the last deduplication. The duration of time may be used to schedule the deduplication of the storage volume, such that the deduplication will complete immediately prior to the start of the next scheduled backup.

If the scheduled backup intervals of a storage volume can be delayed or rescheduled, the system may allow a deduplication of a storage volume to complete prior to backing up the storage volume. In this instance, the system may delay, reschedule, or otherwise prevent any backup operations from starting while a deduplication of the storage volume is occurring. The storage volume may be backed up immediately after the deduplication of the storage volume completes. Coordinating the deduplication and backup operations of a storage volume ensures that duplicate data is not stored in the backup datasets.

Figure 1:
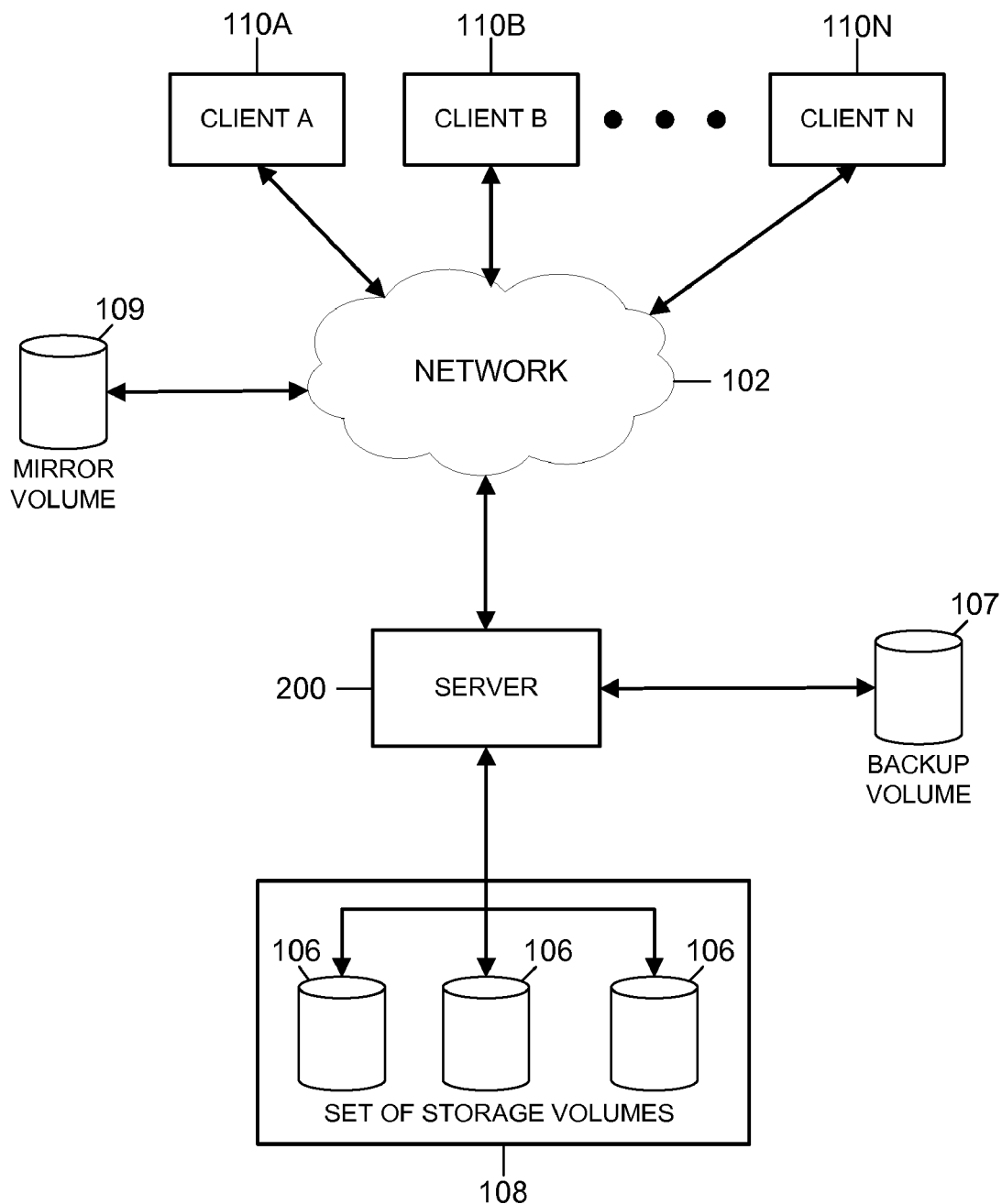
FIG. 1 is a block diagram of an exemplary network environment of an embodiment.

Turning now to the drawings, FIG. 1 provides a general overview of an exemplary network environment 100 implementing an embodiment for coordinating deduplication operations and backup operations of a storage volume. Not all of the depicted components may be required, however, and some implementations may include additional components. Variations in the arrangement and type of the components may be made without departing from the spirit or scope of the claims as set forth herein. Additional, different or fewer components may be provided.

Network 102 can be a local area network (LAN), a wide area network (WAN), virtual private network (VPN) utilizing communication links over the interne, for example, or a combination of LAN, WAN, and VPN implementations. For the purposes of this description, the term network should be taken broadly to include any acceptable network architecture. The network 102 interconnects various clients 110A-N. Also attached to the network 102 is a server 200. The server 200, which is described in more detail in FIG. 2 below, is configured to control storage of, and access to, data and a set 108 of interconnected storage volumes 106. The server 200 may also provide operations related to the storage volumes 106, such as backup operations, deduplication operations, and scheduling operations. A storage volume 106 may be single accessible storage area with a single file system, such as an accessible storage area on a hard disk, an optical disc, a tape drive, or generally any storage medium. The server 200 may also control storage of, and access to, a backup volume 107. The backup volume 107 may store a point in time image, also known as a backup, of one of the storage volumes 106. The server 200, the storage volumes 106, and the backup volume 107 may be connected to a common communication and data transfer infrastructure, such as Fibre Channel, and may collectively comprise a storage area network (SAN). Mirror volume 109 may be located remotely from the storage volumes 106 and the backup volume 107, and may store a copy of data stored on the backup volume 107. The mirror volume 109 may be network attached storage (NAS) directly attached to the network 102, or the mirror volume 109 may be accessed through a second server connected to the network 102.

Each of the devices attached to the network 102 includes an appropriate network interface arrangement (not shown) for communicating over the network using desired communication protocols such as the well-known Transport Control Protocol/Internet Protocol (TCP/IP), User Datagram Protocol (UDP), Hyper Text Transport Protocol (HTTP), Simple Network Management Protocol (SNMP), or Virtual Interface Connections (VI).

The server 200 may be an example of a computer that uses a deduplication engine to eliminate duplicate data stored on the storage volumes 106. The deduplication engine may be provided by NetApp, Inc.'s Data ONTAP™ operating system and is discussed in more detail in FIG. 3 below. The deduplication engine may eliminate duplicate data blocks by replacing the duplicate data blocks with a pointer to the original data block. For example, an email system may contain twenty instances of the same one megabyte file attachment, requiring twenty megabytes of physical storage space. However, if the storage volume of the email system is deduplicated, only one instance of the email attachment is stored; each subsequent instance is referenced back to the original instance. Thus, through deduplication, the twenty megabytes of storage originally allocated to the email attachments can be reduced to only one megabyte of storage. The deduplication engine may perform deduplication operations on the storage volumes 106 at periodic intervals, such as on a daily basis.

The server 200 may utilize a backup engine to perform data protection and other tasks such as data mining and data cloning on the storage volumes 106. The backup engine also may be provided by NetApp, Inc.'s Data ONTAP™ operating system and is discussed in more detail in FIG. 3 below. The backup engine may be used to perform a snapshot operation on a storage volume 106. The snapshot operation may create a point-in-time image of a storage volume 106, referred to as a snapshot of the storage volume 106. The snapshot data is often read-only, such that the snapshot data can not be modified. The snapshot data may include files, directories and/or entire storage volumes and may be stored in the backup volume 107. The backup engine may also be used to perform a backup operation on the storage volumes 106. The backup operation may copy all of the data stored on a storage volume 106 to a backup volume 107. The backup volume 107 is often read-only. The backup engine may be configured to create snapshots and/or backups at periodic intervals, such as every hour. In some instances regulations may be in place, such as service level agreements, which require that snapshots and/or backups be created at periodic intervals. The regulations may stipulate that the snapshot and/or backup operations can not be delayed from the periodic intervals.

Since the data stored on the backup volume 107 is often read-only, the backup volume may not be deduplicated, as the deduplication operation requires write access to the data to remove duplicate data blocks. Accordingly, any duplicate data blocks stored on the backup volume 107 are "locked" and can not be removed. In order to prevent duplicate data from being locked in the backup volume 107, the storage volume 106 needs to be deduplicated immediately prior to performing a snapshot or backup operation on the storage volume 106. Since the above mentioned service level agreements may require that periodic snapshot operations and/or backup operations not be delayed, the deduplication of the storage volume 106 must be completed immediately prior to the scheduled start time of the next snapshot or backup operation. If the deduplication operation completes after the start of the periodic snapshot operation or backup operation, duplicate data may be locked in the backup volume 107. Conversely, if the deduplication operation is completed well in advance of the periodic snapshot operation or backup operation, additional duplicate data may accrue in the storage volume 106 prior to the snapshot operation or backup operation, and may be locked in the backup volume 107. The steps of coordinating deduplication operations with backup operations or snapshot operations 106 are discussed in more detail in FIG. 6 below.

The server 200 may also utilize the backup engine to perform mirror operations on the storage volumes 106 and/or backup volume 107. A mirror operation may create a "mirror" or second copy of a data source, such as a mirror of the backup volume 107. The mirror volume 109 may be located remotely from the storage volume 106 and the backup volume 107, so as to ensure that the data stored on the storage volume 106 and backup volume 107 is available for disaster recovery. For example, should a disaster occur at the location of the storage volume 106 and backup volume 107, the data stored on the storage volume 106 could be recovered from the remotely located mirror volume 109.

In a mirror operation, the data stored on the backup volume 107 is transferred over the network 102 to the mirror volume 109. The backup engine may be configured to transfer data from the backup volume 107 to the mirror volume 109 at periodic intervals, such as every hour. Alternatively, the backup engine may be configured to transfer data stored on the backup volume 107 to the mirror volume 109 after each backup operation on the storage volume 106.

The amount of data transferred over the network 102 during a mirror operation to the mirror volume 109 may be minimized by deduplicating the data on the backup volume 107 prior to transferring the data over the network 102 to the mirror volume 109. A backup volume 107 used in conjunction with a mirror volume 109 may not be read-only and, therefore, may be deduplicated. The deduplication operation may be automatically triggered whenever the backup volume 107 is updated. Alternatively, the deduplication of the backup volume 107 may occur on a periodic basis, such as a daily basis. If a mirror operation is scheduled to occur while the backup volume 107 is being deduplicated, the mirror operation may be rescheduled until after the deduplication of the backup volume 107 completes. The steps of coordinating deduplication operations and mirror operations are discussed in more detail in FIG. 7 below.

In some instances, the schedule of the periodic backup or snapshot operations of a storage volume 106 may not be controlled by service level agreements or other regulations. In these cases, if a backup or snapshot operation is scheduled to start while a deduplication operation is occurring, the backup operation or snapshot operation may be rescheduled to start after the completion of the deduplication operation. The steps of coordinating deduplication operations and backup operations when the backup operations can be rescheduled are discussed in more detail in FIG. 8 below.

Figure 2:
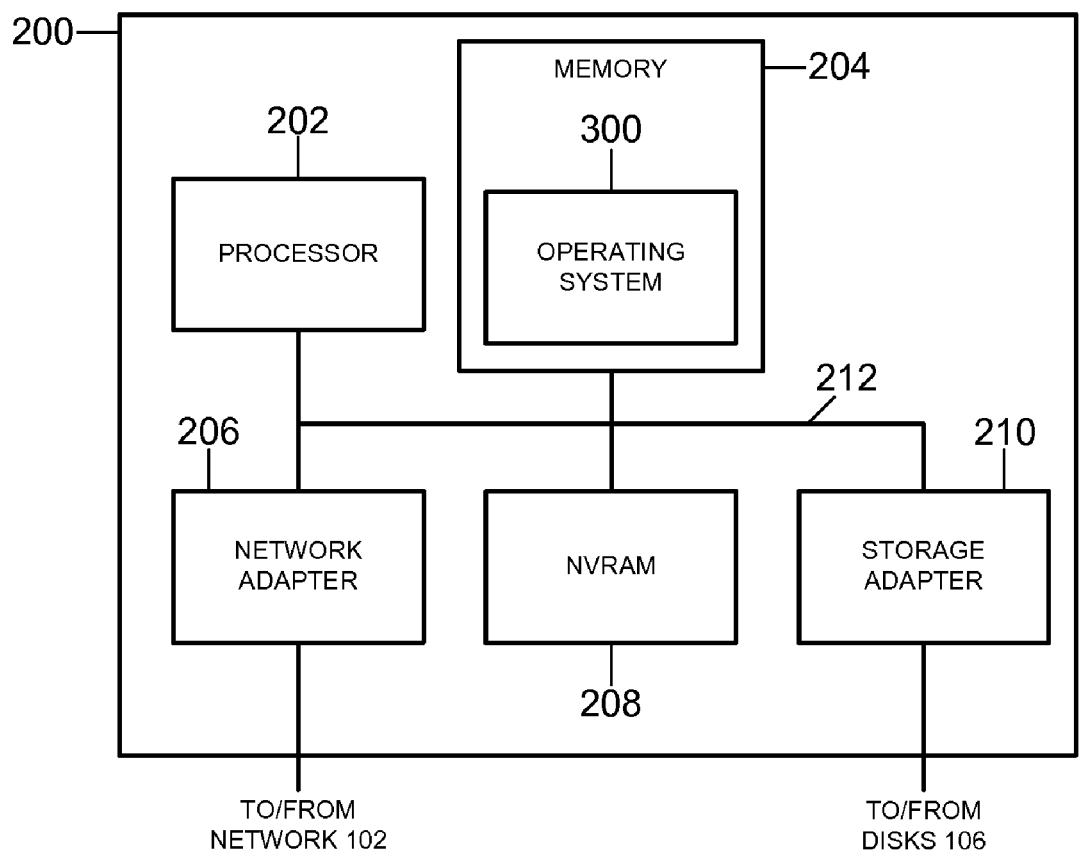
FIG. 2 is a block diagram of an exemplary server of an embodiment.

FIG. 2 is a block diagram of an exemplary server 200 in the network environment 100 of FIG. 1. The server 200 may be a computer that provides file and/or block based services relating to the organization of information on storage devices, such as disks. The server 200 may provide information stored on the storage devices in response to file access requests and/or block based access requests. The embodiments described herein can apply to any type of server 200, whether implemented as a special-purpose or general-purpose computer, including a standalone computer. The server 200 comprises a processor 202, a memory 204, a network adapter 206, a nonvolatile random access memory (NVRAM) 208, and a storage adapter 210 interconnected by system bus 212. Contained within the memory 204 is an operating system 300 that implements a file system to logically organize the information as a hierarchical structure of directories and files on the disks. The memory 204 includes storage locations that are addressable by the processor 202 and adapters for storing software program code. Portions of the operating system 300 are resident in memory 204 and executed by the processor 202. The operating system 300 functionally organizes the server 200 by, inter alia, invoking storage operations in support of a file service implemented by the server 200.

The network adapter 206 comprises the mechanical, electrical and signaling circuitry needed to connect the server 200 to clients 110A-N over network 102 (FIG. 1). Clients 110A-N may be general-purpose computers configured to execute applications, such as data base applications. Moreover, clients 110A-N may interact with the server 200 in accordance with the client/server model of information delivery. That is, a client A 110A may request the services of the server 200, and the server 200 may return the results of the services requested by client A 110A, by exchanging packets defined by an appropriate networking protocol.

The storage adapter 210 incorporates with the operating system 300 executing on the server 200 to access information requested by a client A 110A. Information may be stored on the storage volumes 106 (FIG. 1) which may be attached via the storage adapter 210 to the server 200. The storage adapter 210 includes input/output (I/O) interface circuitry that couples to the storage volumes 106 over an I/O interconnect arrangement, such as a high-performance Fibre Channel serial link topology. The information is retrieved by the storage adapter 210 and, if necessary, processed by the processor 202 (or the adapter 210 itself) prior to be forwarded over the system bus 212 to the network adapter 206, where information is formatted into appropriate packets and returned to client A 110A.

In one exemplary server implementation, the server 200 can include a non-volatile random access memory (NVRAM) 208 that provides fault-tolerant backup of data, enabling the integrity of server transactions to survive a service interruption based upon a power failure or other fault.

One type of file system that may be configured to operate on the server 200 is a "write in-place" file system, an example of which is the Berkeley Software Distribution (BSD™) Fast File System. In a write in-place file system, the locations of the data structures, such as inodes and data blocks, on disk may be fixed. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated, and the appropriate inode is updated to reference that data block.

Another type of file system that may be configured to operate on the server 200 is a write-anywhere file system that does not overwrite data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on the server 200 is the Write Anywhere File Layout (WAFL™) file system available from NetApp, Inc. of Sunnyvale, Calif. The WAFL file system is implemented within a microkernel as part of the overall protocol stack of the server 200 and associated disk storage. This microkernel is supplied as part of NetApp, Inc.'s Data ONTAP™ operating system, residing on the server 200, which processes file-service requests from network-attached clients.

Figure 3:
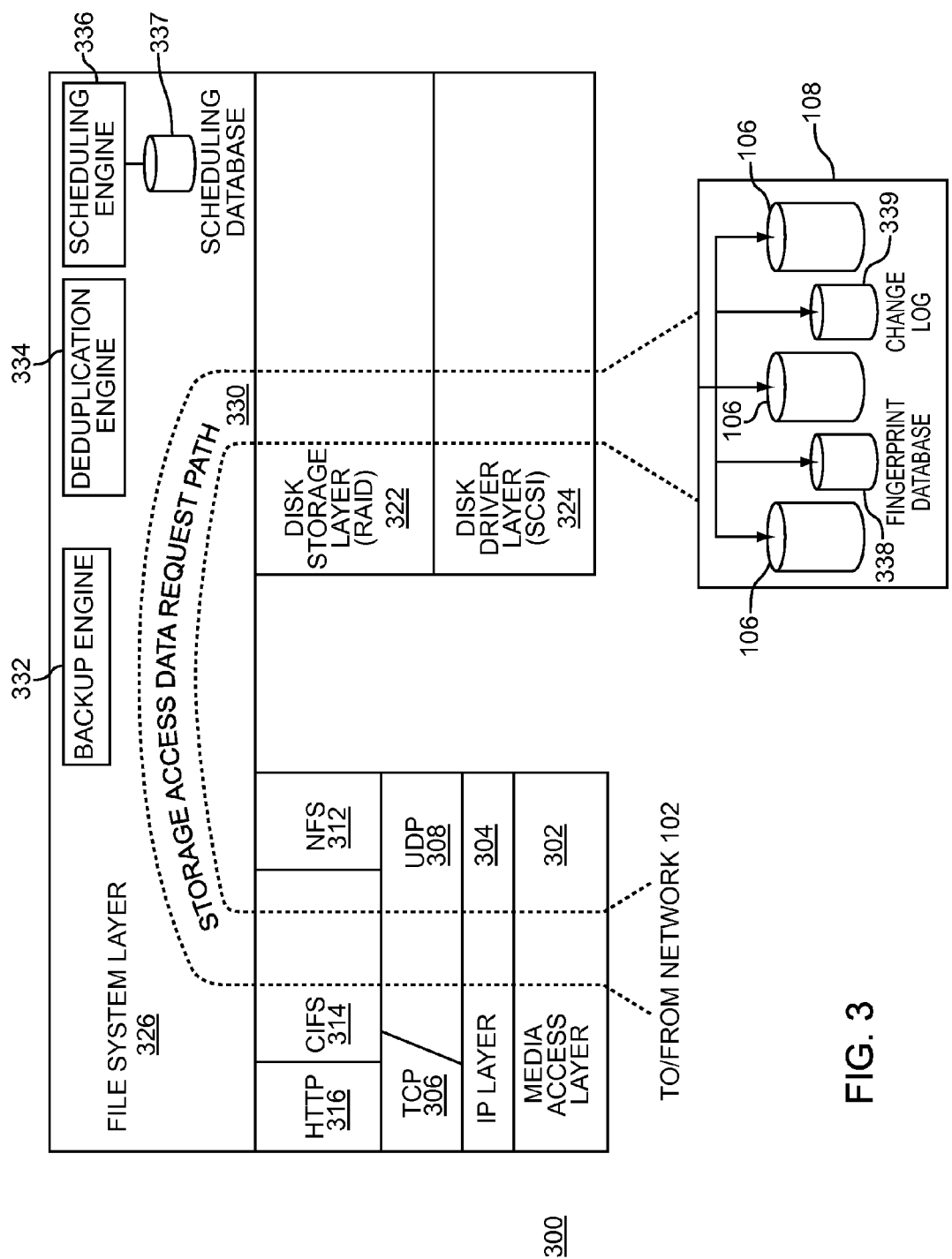
FIG. 3 is a block diagram of an exemplary operating system implemented by the server of FIG. 2.

FIG. 3 is a block diagram of an exemplary operating system 300 implemented by the server 200 of FIG. 2. Not all of the depicted components may be required, however, and some implementations may include additional components. Variations in the arrangement and type of the components may be made without departing from the spirit or scope of the claims as set forth herein. Additional, different, or fewer components may be provided.

The operating system 300, such as NetApp, Inc.'s Data ONTAP™ operating system, includes a series of software layers, such as a media access layer 302 of network drivers (e.g., an Ethernet driver). The operating system 300 further includes network protocol layers, such as an Internet Protocol (IP) layer 304 and its supporting transport mechanisms, the Transport Control Protocol (TCP) layer 306 and the User Datagram Protocol (UDP) layer 308.

A file system protocol layer provides multi-protocol data access and includes support for the Network File System (NFS) protocol 312, the Common Internet File System (CIFS) protocol 314 and the Hyper Text Transfer Protocol (HTTP) 316. In addition, the operating system 300 includes a disk storage layer 322 that implements a disk storage protocol, such as a RAID protocol, and a disk driver layer 324 that implements a disk access protocol such as a Small Computer System Interface (SCSI) protocol.

A file system layer 326 bridges the disk software layers with the network and file system protocol layers. Generally, the file system layer 326 implements a file system having an on-disk format representation that is block-based using, e.g., 4-kilobyte (KB) data blocks and using inodes to describe the files. In response to transaction requests, the file system 326 generates operations to load (retrieve) the requested data from storage volumes 106 if it is not resident "in-core", i.e., in the memory 204 of the server 200. If the information is not in memory 204, the file system layer 326 indexes into the inode file using the inode number to access an appropriate entry and retrieve a logical volume block number. The file system layer 326 then passes the logical volume block number to the disk storage (RAID) layer, which maps that logical number to a disk block number and sends the latter to an appropriate driver (for example, an encapsulation of SCSI implemented on a fibre channel disk interconnection) of the disk driver layer 324. The disk driver accesses the disk block number from storage volumes 106 and loads the requested data in memory 204 for processing by the server 200. Upon completion of the request, the server 200 (and operating system 300) returns a reply, such as an acknowledgement packet defined by the CIFS specification, to client A 110A over the network 102.

The storage access request data path 330 needed to perform data storage access for the client requests received by the server 200 may alternately be implemented in hardware, software or a combination of hardware and software. That is, in an alternative embodiment, the storage access request data path 326 may be implemented as logic circuitry embodied, for example, within a microprocessor or controller, like a programmable gate array or an application specific integrated circuit (ASIC). A hardware implementation may increase the performance of the file service provided by the server 200 in response to a file system request issued by the client A 110A.

To facilitate the generalized access to the storage volumes 106, the operating system 300 may implement a write-anywhere file system that logically organizes the information as a hierarchical structure of directories and files on the disks. Each "on-disk" file may be implemented as a set of disk blocks configured to store information, such as data. Each "on-disk" directory may be implemented as a specially formatted file, which stores other files and directories. The operating system 300 can support both file-based access requests and block-based access requests.

The backup engine 332 may control the backup, snapshot, and mirror operations on the storage volumes 106. In one example, the backup engine 332 may utilize NetApp, Inc.'s Data ONTAP SnapVault™ to provide snapshot operations and backup operations, and the backup engine 332 may utilize NetApp, Inc.'s Data ONTAP SnapMirror™ to provide mirror operations. The snapshot, backup, and mirror operations may be scheduled to run on a periodic basis. The schedules may be identified by a client A 110A when the backup, snapshot or mirror operations are first configured for a storage volume 106. The scheduling engine 336 may monitor and modify the schedules for the snapshot, mirror, and backup operations of the storage volumes 106. The scheduling engine 336 may be a standalone application which runs on the server 200. The scheduling engine 336 may run external to the operating system 300, or the scheduling engine 336 may run on the operating system 300. Alternatively, the scheduling engine 336 may reside on a second server. The second server may have the same configuration as the server 200, such as including a processor, a memory and a network adapter, and the second server may be in communication with the server 200 via the network 102. The scheduling engine 336 may communicate an instruction to the backup engine 332 to perform a snapshot, backup, or mirror operation at a scheduled time. The instruction may be communicated to the backup engine 332 by calling an application programming interface (API) of the backup engine 332. The backup, snapshot and mirror schedules are often stored in a scheduling database 337, which may be stored on a disk which may be external to the set of storage volume 106. Alternatively, the schedules may be stored in the memory 204. In one example, the scheduling engine 336 may be provided by a provisioning manager which provisions the storage volumes 106 controlled by the server 200.

The deduplication engine 334 may perform the deduplication operations on the storage volumes 106. In one example, the deduplication engine 334 may utilize NetApp, Inc.'s A-SIS™ (Advanced Single-Instance Storage), part of NetApp, Inc.'s Data ONTAP™ operating system, to provide deduplication operations. For example, the deduplication engine 334 may use a fingerprint database 338 to store a hash, or "fingerprint" of each data block stored on a storage volume 106, and an address identifying the data block on the storage volume 106, such as a data block number. The fingerprint of each data block may be generated by a hash function, such as the Message-Digest algorithm 5 (MD5). The fingerprint database 338 is often stored on the disks where the storage volumes 106 are stored. However, the fingerprint database 338 may often be stored outside of the storage volumes 106 in order to achieve higher space savings when performing a deduplication operation on the storage volumes 106. Alternatively or in addition, the fingerprint database 338 may be stored in the memory 204 of the server 200.

The first time a storage volume 106 is deduplicated the deduplication engine 334 populates the fingerprint database 338 with a fingerprint of each data block on the storage volume 106, and the address identifying the data block on the storage volume 106. The deduplication engine 334 then sorts the fingerprint database 334 and identifies any duplicate fingerprints in the fingerprint database 338. If two duplicate fingerprints are found, the deduplication engine 334 uses the address associated with each fingerprint to retrieve the data blocks from the storage volume 106. The deduplication engine 334 may then perform a byte-by-byte comparison of the two data blocks to verify that the data blocks are duplicates. If the byte-by-byte comparison verifies that the data blocks are duplicates, the deduplication engine 334 deduplicates the data blocks.

After the storage volume 106 is deduplicated the first time, the deduplication engine 334 begins to generate metadata related to the storage volume 106 referred to as a change log 339. The change log 339 is often stored on the disks where the storage volumes 106 are stored. However, the change log 339 may often be stored outside of the storage volumes 106 in order to achieve higher space savings when performing deduplication operations on the storage volumes 106. Alternatively or in addition, the change log 339 may be stored in the memory 204 of the server 200. The change log 339 stores a fingerprint of each new data block written to the storage volume 106. Thus, each time a new data block is written to the storage volume 106, the deduplication engine 334 generates a fingerprint of the data block and stores the fingerprint in the change log 339. For each subsequent deduplication of the storage volume 106, the fingerprints stored in the change log 339 are compared with the fingerprints in the fingerprint database 338. In order to identify duplicate fingerprints, the deduplication engine 334 may merge the change log 339 into the fingerprint database 338, and then sort the fingerprint database 338. If a duplicate fingerprint is found, the deduplication engine 334 retrieves the actual data blocks and performs a byte-by-byte comparison of the data blocks. If the byte-by-byte comparison verifies that the data blocks are duplicates, the deduplication engine 334 deduplicates the data blocks. The change log 339 is cleared of fingerprints after each deduplication operation completes.

A storage volume 106 may be deduplicated by the deduplication engine 334 on a periodic basis, such as every hour. The deduplication schedule for each storage volume 106 may be determined by a client A 110A when the storage volume 106 is first configured for deduplication. The deduplication schedules may be stored in the scheduling database 337, which may be stored on a disk which is external to the set of storage volume 106. Alternatively, the schedules may be stored in the memory 204. The scheduling engine 336 may monitor and modify the deduplication schedules for the storage volumes 106, and may instruct the deduplication engine 334 to begin a deduplication operation at a scheduled time, such as by calling an API of the deduplication engine 334.

The scheduling engine 336 may coordinate the deduplication operations of the storage volume 106, and the backup, snapshot, and mirror operations of the storage volume to ensure the storage volume 106 is deduplicated prior to performing a backup, snapshot, or mirror operation. Since service level agreements often require that the backup, snapshot, and mirror operations not be rescheduled, the scheduling engine 336 may need to reschedule deduplication operations to ensure that each storage volume 106 is deduplicated prior to the start of the next backup, snapshot or mirror operation. The scheduling engine 336 may determine the time interval required to complete a deduplication operation and may use the time interval to schedule the deduplication operation such that the deduplication operation will complete prior to the next backup, snapshot, or mirror operation. The steps of coordinating deduplication operations with backup, snapshot, and mirror operations are discussed in more detail in FIGS. 6-8 below.

The time interval required to perform a deduplication operation on a storage volume 106 may vary greatly for each deduplication operation. The scheduling engine 336 may determine the time interval required to complete a deduplication of a storage volume 106 by multiplying the amount of data which needs to be deduplicated on the storage volume 106 by the deduplication rate of the storage volume 106. The amount of data which needs to be deduplicated on the storage volume 106 may be equivalent to the amount of data modified on the storage volume 106 since the last deduplication of the storage volume 106. In one example, the scheduling engine 336 may determine the amount of data modified since the last deduplication based on the number of fingerprints in the change log 339 of the storage volume 106 and the size of the data blocks on the storage volume 106. The steps of determining the amount of data modified on a storage volume 106 since the last deduplication of the storage volume 106 are discussed in more detail in FIG. 4 below.

The deduplication rate of the storage volume 106 may refer to the rate at which the storage volume 106 can be deduplicated. The deduplication rate for a particular deduplication operation can be determined by dividing the amount of data deduplicated by the deduplication operation by the time interval required to complete the deduplication operation. For example, if a deduplication operation deduplicated five megabytes of data and the deduplication operation required five seconds to complete, then the deduplication rate for the deduplication operation would be one megabyte per second. The deduplication rate of a storage volume 106 may be based on the time intervals required to complete previous deduplication operations of the storage volume 106 and the amount of data deduplicated during the previous deduplication operations. For example, after each deduplication operation of a storage volume 106, the deduplication engine 334 may store the amount of data which was deduplicated and the time interval required to complete the deduplication operation. Alternatively, the after each deduplication operation the scheduling engine 336 may store the amount of data which was deduplicated and the time interval required to complete the deduplication. The amount of data and time interval may be stored in the scheduling database 339, on the storage volume 106, or in the memory 204. The stored amount of data modified and time interval values may later be retrieved to determine the deduplication rate of the storage volume 106 prior to subsequent deduplication operations. The steps of determining the deduplication rate of a storage volume 106 are discussed in more detail in FIG. 5 below. If a storage volume 106 is being deduplicated for the first time, and a deduplication rate can not be determined, the deduplication rate of a storage volume of a similar capacity may be used.

Figure 4:
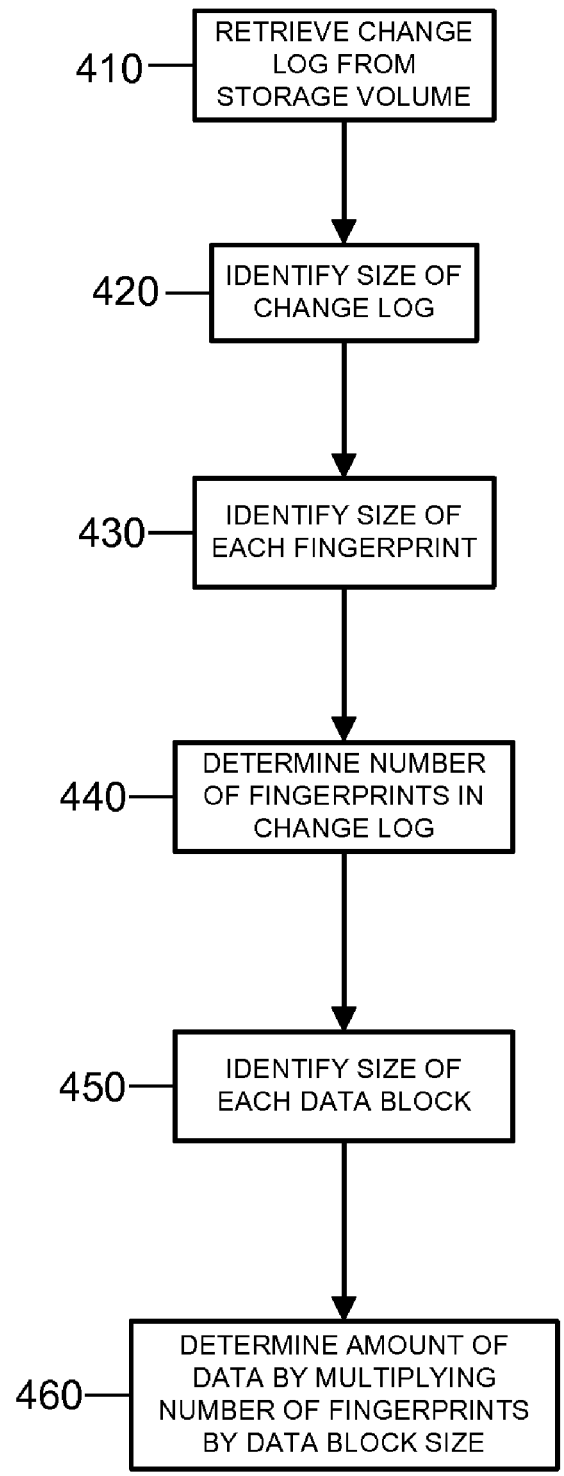
FIG. 4 is a flowchart illustrating an operation for determining the amount of data modified on a storage volume since the last deduplication of the storage volume of an embodiment.

FIG. 4 is a flowchart illustrating an operation for determining the amount of data modified on a storage volume 106 since the last deduplication of the storage volume 106 of an embodiment. The amount of data modified on a storage volume 106 since the last deduplication of the storage volume 106 may be equivalent to the amount of data which needs to be deduplicated on the storage volume 106 during the next deduplication operation. The steps of FIG. 4 are described as being performed by the scheduling engine 336. However, the steps may be performed by the operating system 300 of the server 200, the processor 202 of the server 200, any other hardware component of the server 200, or any combination thereof. Alternatively the steps may be performed by an external hardware component, a software process, or any combination thereof.

At step 410, the scheduling engine 336 retrieves a change log 339 of a storage volume 106 to be deduplicated. As mentioned above, the change log 339 stores a hash, or fingerprint, of each data block on the storage volume 106 which has been modified since the previous deduplication of the storage volume 106. At step 420, the scheduling engine 336 identifies the size of the change log 339 of the storage volume 106. The size of the change log 339 can be identified by measuring the amount of storage space occupied by the change log 339. At step 430, the scheduling engine 336 identifies the size, or length, of each fingerprint in the change log 339. The size of each fingerprint is often determined by the deduplication engine 334 when the storage volume 106 is first configured for deduplication, and may be retrieved from metadata on the storage volume 106. For example, the size of an exemplary fingerprint may be four bytes.

At step 440, the scheduling engine 336 determines the number of fingerprints in the change log 339. The number of fingerprints in the change log 339 may be determined by dividing the size of the change log 339 by the size of each fingerprint. At step 450, the scheduling engine 336 identifies the size of each data block on the storage volume 106. The size of each data block is often determined when the storage volume 106 is first created and may be retrieved from metadata on the storage volume 106, or by measuring the amount of space occupied by a single data block on the storage volume 106. For example, the size of an exemplary data block may be four kilobytes. At step 460, the scheduling engine 336 determines the amount of data modified since the last deduplication of the storage volume 106 by multiplying the number of fingerprints in the change log 339 by the size of each data block. Since there is a one to one correlation between the fingerprints and the data blocks, the number of fingerprints in the change log 339 will equal the number of modified data blocks. The amount of data modified since the last deduplication can then be determined by multiplying the number of fingerprints in the change log 339, equivalent to the number of data blocks modified, by the size of each data block. The scheduling engine 336 may use the amount of data modified on the storage volume 106 since the last deduplication operation to determine the time interval required for the next deduplication operation of the storage volume 106 as discussed in FIGS. 6-8 below.

Figure 5:
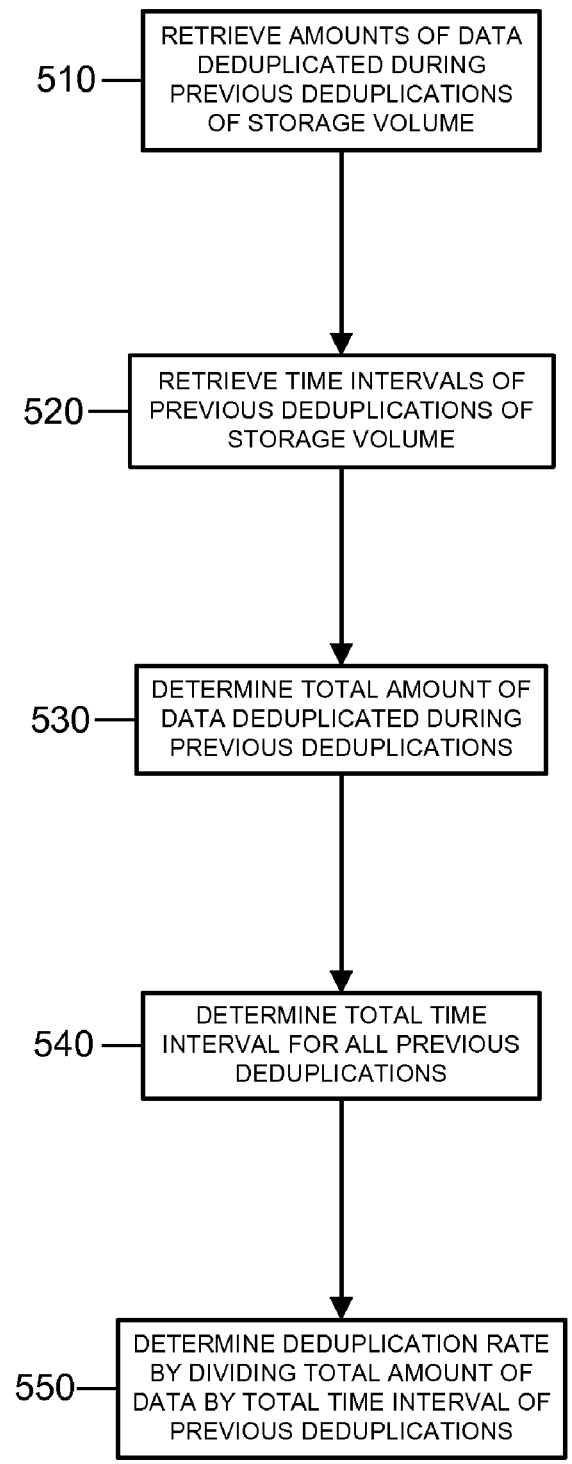
FIG. 5 is a flowchart illustrating an operation for determining a deduplication rate of a storage volume of an embodiment.

FIG. 5 is a flowchart illustrating an operation for determining a deduplication rate of a storage volume 106 of an embodiment. The steps of FIG. 5 are described as being performed by the scheduling engine 336. However, the steps may be performed by the operating system 300 of the server 200, the processor 202 of the server 200, any other hardware component of the server 200, or any combination thereof. Alternatively the steps may be performed by an external hardware component, a software process, or any combination thereof.

At step 510, the scheduling engine 336 retrieves the amounts of data deduplicated during previous deduplications of the storage volume 106. As mentioned above, after a deduplication operation completes the amount of data deduplicated during the deduplication operation may be stored in the scheduling database 337, on the storage volume 106, or in the memory 204. The amount of data deduplicated during a deduplication operation is equal to the amount of data modified on the storage volume 106 since the last deduplication operation. The scheduling engine 336 may retrieve the amounts of data deduplicated for all previous deduplication operations, or the scheduling engine 336 may retrieve the amounts of data deduplicated from the most recent deduplication operations of the storage volume 106, such as the last five deduplication operations. If the storage volume 106 was not previously deduplicated, the scheduling engine 336 may retrieve the amounts of data deduplicated during previous deduplications of a storage volume 106 of a similar capacity.

At step 520, the scheduling engine 336 retrieves the time intervals required to complete the previous deduplications of the storage volume 106. As mentioned above, after a deduplication operation completes the time interval required to complete the deduplication operation may be stored in the scheduling database 337, on the storage volume 106 or in the memory 204. The scheduling engine 336 may retrieve the time intervals for all of the previous deduplication operations of the storage volume 106, or the scheduling engine 336 may retrieve the time intervals for the most recent deduplication operations of the storage volume, such as the last five deduplication operations. If the storage volume 106 was not previously deduplicated, the scheduling engine 336 may retrieve the deduplication time intervals of a storage volume 106 of a similar capacity.

At step 530, the scheduling engine 336 determines the total amount of data deduplicated during previous deduplications of the storage volume 106. The scheduling engine 336 may determine the total amount of data deduplicated by adding each of the individual amounts of data deduplicated. At step 540, the scheduling engine 336 determines the total time interval of all the previous deduplications. The total time interval of all the previous deduplications may be determined by adding the time intervals for each of the previous deduplications.

At step 550, the scheduling engine 336 determines the deduplication rate of the storage volume 106 by dividing the determined total amount of data deduplicated during all previous deduplications of the storage volume 106 by the determined total time interval of all previous deduplications of the storage volume 106. The scheduling engine 336 may then use the deduplication rate of the storage volume 106 to determine the time interval required to complete the next scheduled deduplication of the storage volume 106. The time interval required to complete the next scheduled deduplication of the storage volume 106 may be used by the scheduling engine 336 to coordinate the next scheduled deduplication of the storage volume 106 with backup, snapshot, and mirror operations as discussed in FIGS. 6-8 below.

Figure 6:
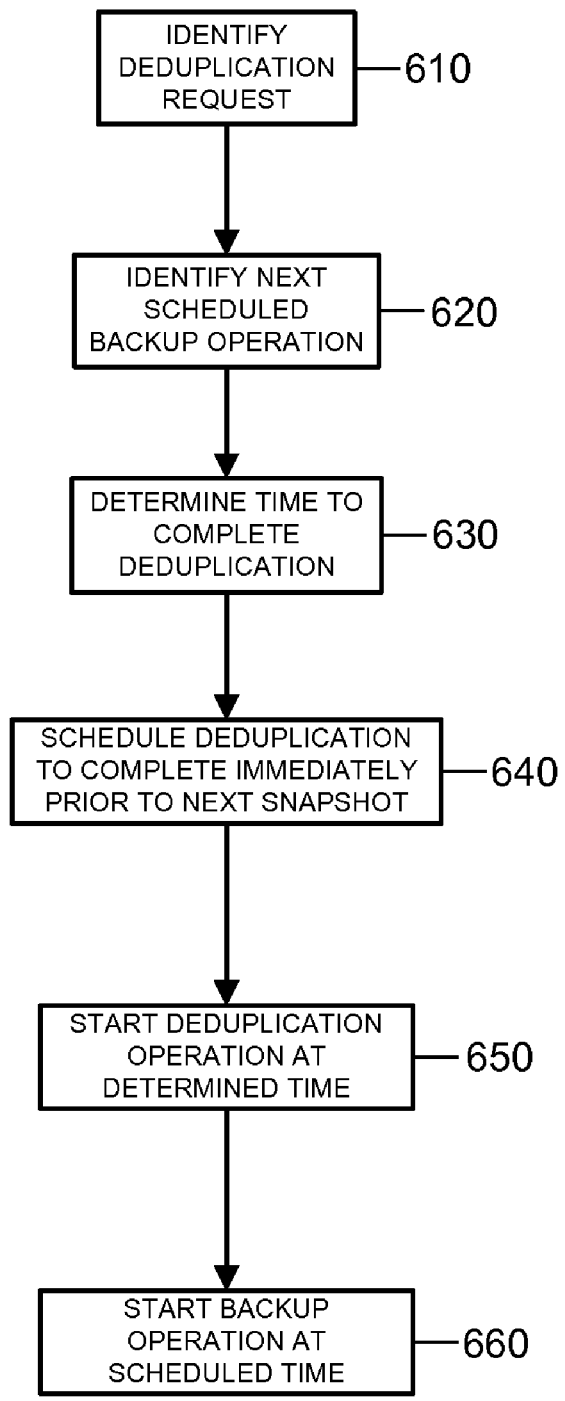
FIG. 6 is a flowchart illustrating an operation for scheduling a deduplication operation to complete prior to the start of a backup operation of an embodiment.

FIG. 6 is a flowchart illustrating an operation for scheduling a deduplication operation to complete prior to the start of a backup or snapshot operation of an embodiment. The steps of FIG. 6 are described as being performed by the scheduling engine 336. However, the steps may be performed by the operating system 300 of the server 200, the processor 202 of the server 200, any other hardware component of the server 200, or any combination thereof. Alternatively the steps may be performed by an external hardware component, a software process, or any combination thereof.

At step 610, the scheduling engine 336 may identify a request to start a deduplication operation on the storage volume 106. The request may be received by the scheduling engine 336 from the client A 110A. Alternatively, the request may be identified by the scheduling engine 336 in a deduplication schedule of the storage volume 106. As mentioned above, the scheduling engine 336 may monitor a deduplication schedule of the storage volume 106. A deduplication schedule may be a set of requests to deduplicate the storage volume 106 at a set of start times determined by the client A 110A. The scheduling engine 336 may also be configured to generate a request to deduplicate the storage volume 106 when the change log 339 of the storage volume 106 exceeds a certain size.

At step 620, the scheduling engine 336 identifies the next backup operation scheduled for the storage volume 106. Alternatively, the scheduling engine may identify the next snapshot operation scheduled for the storage volume 106. As previously mentioned, a snapshot may be a point-in-time image of the storage volume 106. The backup and snapshot operations may be scheduled to occur on a periodic basis. The backup and snapshot schedules may be governed by a service level agreement, or other regulations, which may require that the start time of each scheduled backup or snapshot operation may not be delayed.

At step 630, the scheduling engine 336 determines the time interval which will be required to perform the identified deduplication operation on the storage volume 106. As mentioned above, the time interval may be determined by multiplying the amount of data modified on the storage volume 106 since the last deduplication of the storage volume 106 by the deduplication rate of the storage volume 106. Thus, the formula for the determination of the time interval is: time_interval=data_modified*deduplication_rate. For example, if ten megabytes of data were modified on the storage volume 106 since the last deduplication, and if the deduplication rate of the storage volume 106 is one megabyte per second, then it may take ten seconds to deduplicate the storage volume 106. The steps of determining the amount of data modified on the storage volume 106 since the last deduplication of the storage volume 106 are discussed in more detail in FIG. 4 above. The steps of determining the deduplication rate of the storage volume 106 are discussed in more detail in FIG. 5 above.

At step 640, the scheduling engine 336 may schedule the deduplication of the storage volume 106 such that the deduplication operation will complete immediately prior to the start of the next scheduled backup or snapshot operation of the storage volume 106. The scheduling engine 336 may utilize the start time of the next scheduled backup or snapshot operation, and the time interval required to complete the deduplication operation, to schedule the start of the deduplication operation. For example, the scheduling engine 336 may subtract the time interval required to complete the deduplication operation from the start time of the next scheduled backup or snapshot operation to determine the start time of the deduplication operation. In this example, the deduplication of the storage volume 106 would be scheduled to start at a time that ensures the deduplication operation will complete immediately prior to the start of the next backup or snapshot operation. By scheduling the deduplication operation to complete immediately prior to the start of the next backup or snapshot operation, the scheduling engine 336 ensures that no duplicate data is stored in the backup volume 107. The scheduling engine 336 may store the scheduled start time in the scheduling database 337.

At step 650, the scheduling engine 336 communicates an instruction to the deduplication engine 334 to start the deduplication operation of the storage volume 106 at the determined start time. The scheduling engine 336 may communicate the instruction by calling an API of the deduplication engine 334. The deduplication engine 334 receives the instruction and deduplicates the storage volume 106. At step 660, the scheduling engine 336 communicates an instruction to the backup engine 332 to start the backup or snapshot operation of the storage volume 106 at the scheduled time, after the deduplication operation has completed. The scheduling engine 336 may communicate the instruction to the backup engine 332 by calling an API of the backup engine 332. The backup engine 332 receives the instruction and performs the backup or snapshot operation on the storage volume 106. Since a deduplication operation was performed on the storage volume 106 prior to the backup or snapshot operation, no duplicate data is locked in the backup or snapshot volume, thereby conserving storage resources.

Figure 7:
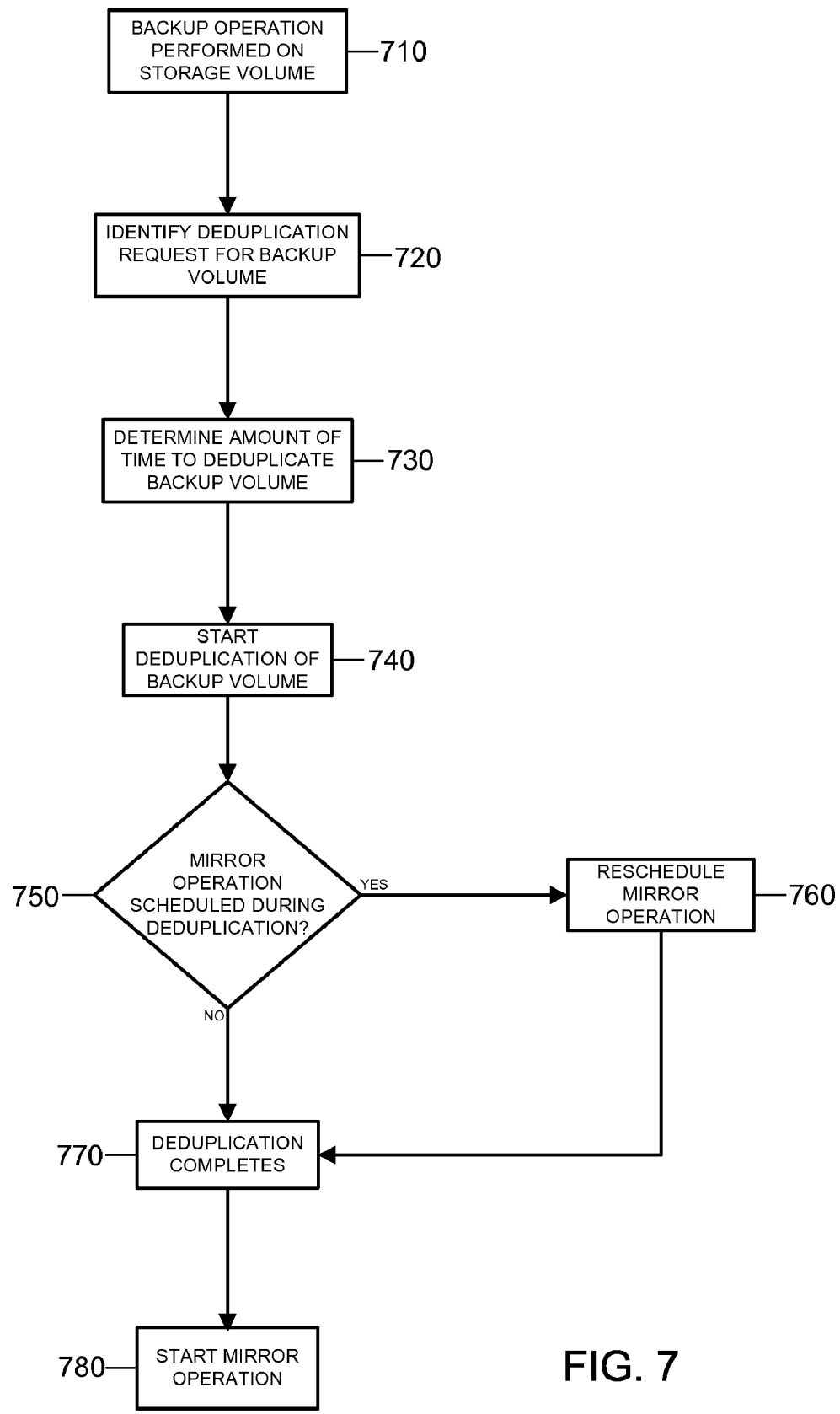
FIG. 7 is a flowchart illustrating an operation for scheduling a deduplication operation to complete prior to the start of a mirror operation of an embodiment.

FIG. 7 is a flowchart illustrating an operation for scheduling a deduplication operation to complete prior to the start of a mirror operation of an embodiment. The steps of FIG. 7 are described as being performed by the scheduling engine 336 and the backup engine 332. However, the steps may be performed by the operating system 300 of the server 200, the processor 202 of the server 200, any other hardware component of the server 200, or any combination thereof. Alternatively the steps may be performed by an external hardware component, a software process, or any combination thereof.

At step 710, the backup engine 332 performs a backup operation on the storage volume 106. The backup operation may transfer data from the storage volume 106 to the backup volume 107. The storage volume 106 and the backup volume 107 may be located in close proximity, and the data may be transferred from the storage volume 106 to the backup volume 107 over a local area network. The backup volume 107 may not be read-only and, therefore, may be deduplicated. The backup volume 107 may be configured by the client A 110A to be mirrored by a mirror volume 109, or a remote copy, of the backup volume 107. The mirror volume 109 may be remotely located from the backup volume 107, so as to ensure at least one of the backup volume 107 or the mirror volume 109 is available for disaster recovery. The client A 110A may create a mirror schedule for the backup volume 107. The mirror schedule may be a set of requests to perform a mirror operation on the backup volume 107 at a set of start times determined by the client A 110A.

At step 720, the scheduling engine 336 identifies a request to perform a deduplication operation on the backup volume 107. For example, the backup engine 332 may request that a deduplication operation be performed on the backup volume 107 after each backup operation completes. Alternatively, the scheduling engine 336 may identify a scheduled deduplication operation in the scheduling database 337. At step 730, the scheduling engine 336 determines the time interval which will be required to perform the deduplication operation on the backup volume 107. As mentioned above, the time interval may be determined by multiplying the amount of data modified on the backup volume 107 since the last deduplication of the backup volume 107 by the deduplication rate of the backup volume 107. The steps of determining the amount of data modified on the backup volume 107 since the last deduplication of the backup volume 107 are discussed in more detail in FIG. 4 above. The steps of determining the deduplication rate of the backup volume 107 are discussed in more detail in FIG. 5 above.

At step 740, the scheduling engine 336 may communicate an instruction to the deduplication engine 334 to start a deduplication of the backup volume 107. The scheduling engine 336 may communicate the instruction to the deduplication engine 334 by calling an API of the deduplication engine 334. The deduplication engine 334 receives the instruction and starts a deduplication operation on the backup volume 107. At step 750, the scheduling engine 336 may determine whether a mirror operation on the backup volume 107 is scheduled to start during the deduplication operation of the backup volume 107 based on the determined time interval required to deduplicate the backup volume 107. For example, the scheduling engine 336 may retrieve the start time of the next scheduled mirror operation from the mirror schedule of the backup volume 107. If the next mirror operation is scheduled to start before the time interval required to deduplicate the backup volume 107 has elapsed, then the mirror operation is scheduled to start during the deduplication of the backup volume 107. If a mirror operation is scheduled to start during the deduplication of the backup volume 107, the scheduling engine 336 may move to step 760. At step 760, the scheduling engine 336 may reschedule the mirror operation to start immediately after the completion of the deduplication of the backup volume 107. The scheduling engine 336 may use the time interval required to complete the deduplication of the backup volume 107 to reschedule the mirror operation. The scheduling engine 336 may store the rescheduled start time of the mirror operation in the scheduling database 337.

If, at step 750, the scheduling engine 336 determines there is not a mirror operation scheduled to start during the deduplication operation, the scheduling engine 336 moves to step 770. At step 770, the deduplication engine 334 completes the deduplication of the backup volume 107. At step 780, the scheduling engine 336 communicates an instruction to the backup engine 332 to start the mirror operation of the backup volume 107. The scheduling engine 334 may communicate the instruction to the backup engine 332 by calling an API of the backup engine 332. The backup engine 332 performs the mirror operation by transferring the data from the backup volume 107 to the mirror volume 109 over the network 102. Since a deduplication operation was performed on the backup volume 107, no duplicate data is transferred from the backup volume 107 to the mirror volume 109 over the network 102, thereby conserving network resources.

Figure 8:
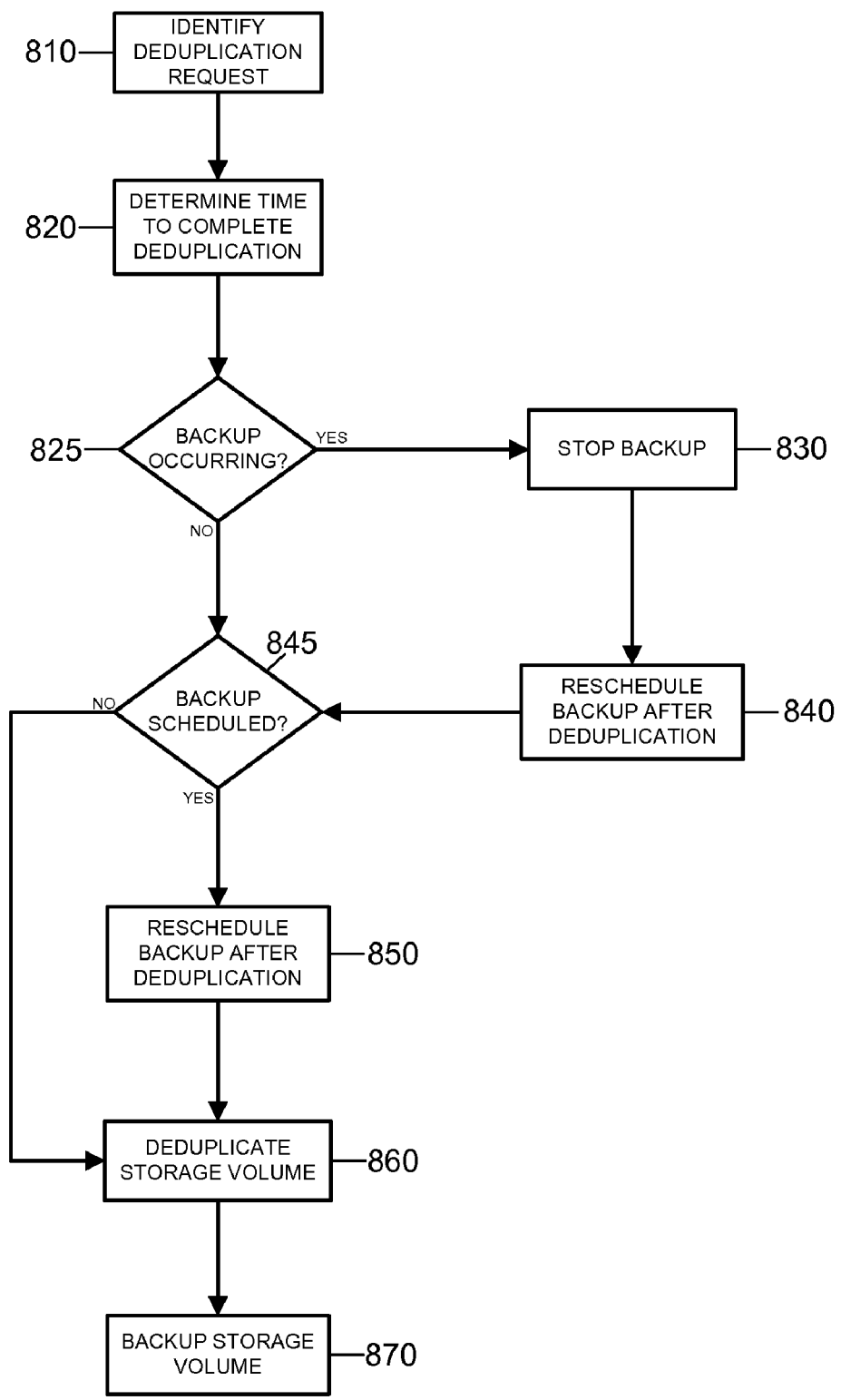
FIG. 8 is a flowchart illustrating an operation for scheduling a deduplication operation to complete prior to the start of a backup operation of an embodiment when the backup operation can be delayed.

FIG. 8 is a flowchart illustrating an operation for scheduling a deduplication operation to complete prior to the start of a backup operation of an embodiment when the backup operation can be delayed. The steps of FIG. 8 are described as being performed by the scheduling engine 336. However, the steps may be performed by the operating system 300 of the server 200, the processor 202 of the server 200, any other hardware component of the server 200, or any combination thereof. Alternatively the steps may be performed by an external hardware component, a software process, or any combination thereof.

At step 810, the scheduling engine 336 may identify a request to start a deduplication operation on the storage volume 106. The request may be received by the scheduling engine 336 from the client A 110A. Alternatively, the request may be identified by the scheduling engine 336 in a deduplication schedule of the storage volume 106. As mentioned above, the scheduling engine 336 may monitor a deduplication schedule of the storage volume 106. The scheduling engine 336 may also be configured to generate a request to deduplicate the storage volume 106 when the change log of the storage volume 106 exceeds a certain size.

At step 820, the scheduling engine 336 determines the time interval which will be required to perform the deduplication operation on the storage volume 106. As mentioned above, the time interval may be determined by multiplying the amount of data modified on the storage volume 106 since the last deduplication of the storage volume 106 by the deduplication rate of the storage volume 106. The steps of determining the amount of data modified on the storage volume 106 since the last deduplication of the storage volume 106 are discussed in more detail in FIG. 4 above. The steps of determining the deduplication rate of the storage volume 106 are discussed in more detail in FIG. 5 above.

At step 825, the scheduling engine 336 may determine whether a backup or snapshot operation of the storage volume 106 is currently occurring. The scheduling engine 336 may determine if a backup or snapshot operation of the storage volume 106 is currently occurring by polling the backup engine 332 or calling an API of the backup engine 332. Alternatively, the scheduling engine 336 may determine whether a backup or snapshot operation of the storage volume 106 is currently occurring by retrieving the backup schedule of the storage volume 106. If a backup operation of the storage volume 106 is currently occurring, the scheduling engine 336 moves to step 830.

At step 830, the scheduling engine 336 communicates an instruction to the backup engine 332 to stop the backup operation. The scheduling engine 336 may communicate the instruction to the backup engine 332 by calling an API of the backup engine. The backup engine 332 receives the instruction and stops performing the backup operation. In some instances the backup engine 332 may not support an operation for stopping the backup operation and therefore the backup operation may not be stopped at step 830. At step 840, the scheduling engine 336 reschedules the backup operation to start immediately after the completion of the deduplication operation of the storage volume 106. The scheduling engine 336 may use the time interval required to deduplicate the storage volume 106 to reschedule the backup operation to start after the completion of the deduplication operation. The scheduling engine 336 may store the rescheduled start time of the backup operation in the scheduling database 337.

If, at step 825, the scheduling engine 336 determines that a backup of the storage volume 106 is not currently occurring, the scheduling engine 336 moves to step 845. At step 845, the scheduling engine 336 determines whether a backup operation of the storage volume 106 is scheduled to start during the time required for completing the deduplication operation, based on the time interval required to deduplicate the storage volume 106. For example, the scheduling engine 336 may retrieve the start time of the next scheduled backup operation. If the next scheduled backup operation is scheduled to start before the time interval required to deduplicate the backup volume 107 has elapsed, then the backup operation is scheduled to start during the deduplication of the storage volume 106. If a backup operation is scheduled to start during the time interval required for the deduplication operation, the server 200 moves to step 850. At step 850, the scheduling engine 336 reschedules the backup operation to start after the completion of the deduplication operation. The scheduling engine 336 may store the rescheduled start time of the backup operation in the scheduling database 337.

If, at step 845, the scheduling engine 336 determines that a backup operation is not scheduled to start during the time interval required for the deduplication operation, the scheduling engine 336 moves to step 860. At step 860, the scheduling engine 336 communicates an instruction to the deduplication engine 334 to perform a deduplication operation on the storage volume 106. The scheduling engine 336 may communicate the instruction to the deduplication engine 334 by calling and API of the deduplication engine 334. The deduplication engine 334 receives the instruction and performs the deduplication operation on the storage volume 106. At step 870, the scheduling engine 336 communicates an instruction to the backup engine 332 to perform a backup operation on the storage volume 106. The scheduling engine 336 may communicate the instruction to the backup engine 332 by calling an API of the backup engine 332. The scheduling engine 336 communicates the instruction after the deduplication engine 334 completes the deduplication operation. The backup engine 332 receives the instruction and performs the backup operation on the storage volume 106. Since the backup operation was delayed until after the completion of the deduplication operation, no duplicate data is stored in the backup volume 107, thereby conserving storage resources.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer implemented method for coordinating deduplication operations and backup operations of a storage volume, the method comprising:
    identifying, by a processor, a request to eliminate duplicate data from a storage volume, wherein a plurality of backup operations are scheduled to be performed on the storage volume;
    determining, by the processor, a duration of time required to complete an operation to eliminate duplicate data from the storage volume, the duration of time being based on an amount of data modified on the storage volume since a last operation to eliminate duplicate data from storage volume;
    determining, by the processor, a start time for the operation to eliminate duplicate data based on the duration of time required to complete the operation and a start time of a next scheduled backup operation, such that the operation will complete prior to the start time of the next scheduled backup of the storage volume; and
    initiating, by the processor, the operation to eliminate duplicate data at the determining start time, such that the operation will complete prior to the start time of the next scheduled backup of the storage volume.

2. The method of claim 1 wherein determining, by the processor, the duration of time required to complete the operation to eliminate duplicate data from the storage volume further comprises:
- determining, by the processor, a deduplication rate of the storage volume;
- determining, by the processor, the amount of data modified on the storage volume since the last operation to eliminate duplicate data from storage volume; and
- determining, by the processor, the duration of time required to complete the operation to eliminate duplicate data from the storage volume by multiplying the deduplication rate of the storage volume by the amount of data modified on the storage volume since the last operation to eliminate duplicate data from the storage volume.

3. The method of claim 2 wherein determining, by the processor, the amount of data modified on the storage volume since the last operation to eliminate duplicate data from the storage volume further comprises:
- identifying, by the processor, a number of fingerprints in a change log of the storage volume; and
- determining, by the processor, the amount of data modified on the storage volume since the last operation to eliminate duplicate data from the storage volume by dividing the number of fingerprints in the change log by a size of a data block on the storage volume.

4. The method of claim 2 wherein determining, by the processor, the deduplication rate of the storage volume further comprises:
- identifying, by the processor, an amount of data modified on the storage volume prior to a previous operation to eliminate duplicate data from the storage volume;
- identifying, by the processor, a time interval required to complete the previous operation to eliminate duplicate data from the storage volume; and
- determining, by the processor, the deduplication rate of the storage volume by dividing the amount of data modified on the storage volume prior to the previous operation to eliminate duplicate data from the storage volume by the time interval required to complete the previous operation to eliminate duplicate data from the storage volume.

5. The method of claim 1 wherein the start time of the next scheduled backup operation can not be modified.

6. The method of claim 1 further comprising:
- creating, by the processor, a backup volume of the storage volume at the start time of the next scheduled backup operation.

7. The method of claim 6 wherein the backup volume can not be modified.

8. The method of claim 6 wherein the backup volume comprises of a point-in-time image of the storage volume.

9. A computer implemented method for coordinating deduplication operations and backup operations of a storage volume, the method comprising:
- identifying, by a processor, a request to deduplicate a storage volume, wherein a backup operation is scheduled for the storage volume;
- determining, by the processor, a duration of time required to deduplicate the storage volume, the duration of time based on an amount of data modified on the storage volume since a last deduplication operation of the storage volume; and
- performing, by the processor, a deduplication operation of the storage volume, wherein the deduplication operation starts the determined duration of time prior to a start time of the backup operation, such that the deduplication operation will complete prior to the start time of the backup operation.

10. The method of claim 9 wherein determining, by the processor, the duration of time required to deduplicate the storage volume further comprises:
- determining, by the processor, a deduplication rate of the storage volume;
- determining, by the processor, the amount of data modified on the storage volume since the last deduplication operation of the storage volume; and
- determining, by the processor, the duration of time required to deduplicate the storage volume by multiplying the deduplication rate of the storage volume by the amount of data modified on the storage volume since the last deduplication operation of the storage volume.

11. The method of claim 10 wherein determining, by the processor, the amount of data modified on the storage volume since the last deduplication operation of the storage volume further comprises:
- identifying, by the processor, a number of fingerprints in a change log of the storage volume; and
- determining, by the processor, the amount of data modified on the storage volume since the last deduplication operation of the storage volume by dividing the number of fingerprints in the change log by a size of a data block on the storage volume.

12. The method of claim 10 wherein determining, by the processor, the deduplication rate of the storage volume further comprises:
- identifying, by the processor, an amount of data modified on the storage volume prior to a previous deduplication operation of the storage volume;
- identifying, by the processor, a time interval required to complete the previous deduplication operation of the storage volume; and
- determining, by the processor, the deduplication rate of the storage volume by dividing the amount of data modified on the storage volume prior to the previous deduplication operation by the time interval required to complete the previous deduplication operation.

13. The method of claim 9 wherein performing the deduplication operation of the storage volume further comprises:
- determining, by the processor, a start time of the deduplication operation, the start time based on the determined duration of time, and the start time of the backup operation, such that the deduplication operation will complete prior to the start time of the backup operation; and
- initiating, by the processor, the deduplication operation of the storage volume at the determined start time.

14. The method of claim 9 wherein the start time of the backup operation can not be modified.

15. The method of claim 9 further comprising:
- creating, by the processor, a backup volume of the storage volume at the start time of the backup operation.

16. The method of claim 15 wherein the backup volume can not be modified.

17. The method of claim 15 wherein the backup volume comprises of a point-in-time image of the storage volume.

18. A system for coordinating deduplication operations and backup operations of a storage volume, the system comprising:
- a storage volume storing a set of data;
- a memory storing a schedule of a plurality of backup operations of the storage volume; and
- a processor operatively connected to the memory and the storage volume and operative to:

identify a request to eliminate duplicate data from the storage volume;

determine a duration of time required to complete an operation to eliminate duplicate data from the storage volume, the duration of time being based on an amount of data modified on the storage volume since a last operation to eliminate duplicate data from the storage volume;

determine a start time for the operation to eliminate duplicate data based on the duration of time required to complete the operation and a start time of a next scheduled backup operation of the storage volume, such that the operation will complete prior to the start time of the next scheduled backup of the storage volume; and initiate the operation to eliminate duplicate data at the determined start time, such that the operation will complete prior to the start time of the next scheduled backup of the storage volume.

19. The system of claim 18 wherein the processor is further operative to:

determine a deduplication rate of the storage volume;

determine the amount of data modified on the storage volume since the last operation to eliminate duplicate data from storage volume; and determine the duration of time required to complete the operation to eliminate duplicate data from the storage volume by multiplying the deduplication rate of the storage volume by the amount of data modified on the storage volume since the last operation to eliminate duplicate data from the storage volume.

20. The system of claim 19 wherein the processor is further operative to:

identify a number of fingerprints in a change log of the storage volume; and determine the amount of data modified on the storage volume since the last operation to eliminate duplicate data from the storage volume by dividing the number of fingerprints in the change log by a size of a data block on the storage volume.

21. The system of claim 19 wherein the processor is further operative to:

identify an amount of data modified on the storage volume prior to a previous operation to eliminate duplicate data from the storage volume;

identify a time interval required to complete the previous operation to eliminate duplicate data from the storage volume; and determine the deduplication rate of the storage volume by dividing the amount of data modified on the storage volume prior to the previous operation to eliminate duplicate data from the storage volume by the time interval required to complete the previous operation to eliminate duplicate data from the storage volume.

22. The system of claim 18 wherein the start time of the next scheduled backup operation can not be modified.

23. The system of claim 18 wherein the processor is further operative to:

initiate an operation to create a backup volume of the storage volume at the start time of the next scheduled backup.

24. The system of claim 23 wherein the backup volume can not be modified.

* * * * *